United States Patent
Comer et al.

(10) Patent No.: US 7,912,124 B2
(45) Date of Patent: Mar. 22, 2011

(54) MOTION COMPENSATION FOR FINE-GRAIN SCALABLE VIDEO

(75) Inventors: Mary Lafuze Comer, Fairmount, IN (US); Izzat Hekmat Izzat, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2045 days.

(21) Appl. No.: 10/479,537

(22) PCT Filed: Jun. 11, 2002

(86) PCT No.: PCT/US02/18444
§ 371 (c)(1),
(2), (4) Date: Dec. 3, 2003

(87) PCT Pub. No.: WO02/102048
PCT Pub. Date: Dec. 19, 2002

(65) Prior Publication Data
US 2004/0156433 A1    Aug. 12, 2004

Related U.S. Application Data

(60) Provisional application No. 60/297,330, filed on Jun. 11, 2001.

(51) Int. Cl.
*H04N 7/12* (2006.01)
(52) U.S. Cl. .................... 375/240.1; 375/240
(58) Field of Classification Search .......... 375/240, 375/240.01
See application file for complete search history.

(56) References Cited

U.S. PATENT DOCUMENTS

| | | | |
|---|---|---|---|
| 5,652,616 A | 7/1997 | Chen et al. | 348/43 |
| 5,956,088 A | 9/1999 | Shen et al. | 348/385 |
| 6,055,330 A | 4/2000 | Eleftheriadis et al. | 382/154 |
| 6,167,084 A | 12/2000 | Wang et al. | 375/240.02 |
| 6,205,177 B1 | 3/2001 | Girod et al. | 375/240.14 |
| 6,249,318 B1 | 6/2001 | Girod et al. | 348/416 |

(Continued)

FOREIGN PATENT DOCUMENTS
WO    WO 00/02392    1/2000

OTHER PUBLICATIONS

Shipeng Li, Feng Wu, and Ya-Qin Zhang, Experimental Results with Progressive Fine Granularity Scalable (PFGS) Coding, Mar. 2000, International Organisation for Standardisation, ISO/IEC JTC1/SC29/WG11 MPEG99/m5742 Coding of Moving Pictures and Audio, p. 17-19.*

(Continued)

*Primary Examiner* — Tung Vo
*Assistant Examiner* — Anner Holder
(74) *Attorney, Agent, or Firm* — Robert D. Shedd; Paul P. Kiel; Guy H. Eriksen

(57) ABSTRACT

A fine-grain scalable video data apparatus, system, method and data structure is disclosed. An encoder (110) for encoding input video data as minimum bitrate macroblock data to produce DCT data having DCT coefficients representing a minimum bitrate version of the macroblock data. The encoder (110) also encodes the input video data as intermediate bitrate macroblock data to produce DCT data having DCT coefficients representing an intermediate bitrate version of the macroblock data. An adaptive motion compensator (132) (whether incorporated within the encoder or externally) communicates with the encoder for predicting whether a decoded version of the intermediate bitrate macroblock data has an accumulated predicted error frame energy exceeding a maximum threshold (228).

21 Claims, 3 Drawing Sheets

U.S. PATENT DOCUMENTS

| | | | |
|---|---|---|---|
| 6,272,179 B1 | 8/2001 | Kadono | 375/240.16 |
| 6,275,536 B1 | 8/2001 | Chen et al. | 375/240.25 |
| 6,289,054 B1 | 9/2001 | Rhee | 375/240.27 |
| 6,292,512 B1 * | 9/2001 | Radha et al. | 375/240.1 |
| 6,327,000 B1 | 12/2001 | Auld et al. | 348/441 |
| 6,353,700 B1 | 3/2002 | Zhou | 386/68 |
| 6,418,242 B1 * | 7/2002 | Maurer | 382/266 |
| 6,668,017 B1 * | 12/2003 | Watanabe | 375/240.12 |
| 6,956,461 B2 | 10/2005 | Yoon | |
| 2002/0031179 A1 | 3/2002 | Rovati et al. | 375/240.16 |
| 2002/0034248 A1 | 3/2002 | Chen | 375/240.08 |
| 2002/0034252 A1 | 3/2002 | Owen et al. | 375/240.17 |
| 2002/0118743 A1 | 8/2002 | Jiang | 375/240.01 |
| 2002/0150158 A1 * | 10/2002 | Wu et al. | 375/240.12 |

OTHER PUBLICATIONS

Shipeng Li et al., Experimental Results with Progressive Fine Granularity Scalable (PFGS Coding. Mar. 2000. International Organisation for Standardisation, ISO/IEC JTC1/SC29/WG11 MPEG99/m5742 Coding of Moving Pictures and Audio, p. 17-19.*

Search Report dated Sep. 19, 2002.

Wu, F. et al., "A Framework for Efficient Progressive Fine Granularity Scalable Video Coding", IEEE Transactions on Circuits and Systems,for Video Technology, IEEE Service Center, Piscataway, NJ, US, vol. 11, No. 3, Mar. 2001, pp. 332-344, XP000994714.

Li., S. et al., "Experimental Results With Progressive Fine Granularity Scalable (PFGS) Coding", ISO/IEC JTC1/SC29/WG11 MPEG 99/M5742, Mar. 2000. page Complete, XP001112953.

Macnicol, J. et al., "Results on Fine Granularity Scalability ISO/IEC JTC1/SC29/WG11 MPEG99/M5122", ISO/IEC JTC1/SC29/WG11 MPEG99/M5122, Oct. 1999, pp. 1-6, XP002165188.

Tan, T. K. et al., "A Frequency Scalable Coding Scheme Employing Pyramid and Subband Techniques", IEEE Transactions on Circuits and Systems for Video Technology, IEEE Service Center, Piscataway, NJ, US, vol. 4, No. 2, Apr. 1, 1994, pp. 203-207, XP000489693.

Sun, X. et al., "Macroblock-Based Progressive Fine Granularity Scalable Video Coding". Multimedia and Expo, 2001, ICME 2001, IEEE International Conference on Aug. 22-25, 2001, Piscataway, NJ USA, IEEE, Aug. 22. 2001, pp. 345-348, XP010661845.

Peng,. W-S et al., "Mode-Adaptive Fine Granularity Scalability", Proceedings 2001 International Conference on Image Processing. ICIP 2001. Thessaloniki, Greece, Oct. 7-10, 2001, International Conference on Image Processing, New York, NY: IEEE, US, vol. 2 of 3, Conf. 8, Oct. 7, 2001, pp. 993-996, XP001045741.

Morello, A., "Flash-TV: A Flexible Bit-Rate Transmission System for Digital HDTV Outside Broadcasting by Satellite", IEEE 1993, RAI, Centro Ricerche, Torino, Italy, pp. 1622-1627.

Sun, Wu, Li, Gao, Zhang—Macroblock-based Progressive Fine Granularity Scalable Video Coding.

PCT Search Report dated: Oct. 8, 2003.

* cited by examiner

MOTION COMPENSATION FOR FINE-GRAIN SCALABLE VIDEO

CROSS-REFERENCES

This application claims the benefit, under 35 U.S.C. §365 of International Application PCT/US02/18444, filed Jun. 11, 2002, which was published in accordance with PCT Article 21(2) on Dec. 19, 2002 in English and which claims the benefit of U.S. Provisional Patent Application Ser. No. 60/297,330, filed Jun. 11, 2001, which is incorporated by reference herein in its entirety.

FIELD OF THE INVENTION

The present disclosure is directed towards fine-grain scalable ("FGS") video encoders, and in particular, to an adaptive motion compensation technique for coding of video data using fine-grain scalability.

BACKGROUND OF THE INVENTION

Digital video data is often processed and transferred in the form of bit streams. A bit stream is fine-grain scalable ("FGS") if the bit stream can be decoded at any one of a finely spaced set of bitrates between pre-determined minimum and maximum rates. Unfortunately, this type of scalability typically results in a coding efficiency that is significantly less than that of a non-scalable video coder-decoder ("CODEC").

The Moving Picture Experts Group ("MPEG") has adopted standards for streaming video. The MPEG-4 standard includes a mode for FGS video. In MPEG-4 FGS video, the current frame is predicted using the minimum-bitrate reconstructed version of the previous frame. With MPEG-4, if a higher-bitrate version of the previous frame were used for prediction, this would lead to prediction drift any time the bit stream was decoded at a rate lower than the rate used for prediction in the encoder. The prediction drift is caused by the difference between the encoder's reference frame and the decoder's reference frame. Accordingly, it is desirable to improve the CODEC efficiency over that of typical FGS schemes such as, for example, the FGS video scheme adopted in the MPEG-4 standard.

SUMMARY OF THE INVENTION

These and other drawbacks and disadvantages of the prior art are addressed by an apparatus and method for motion compensation of fine-grain scalable video data. Fine-grain scalable video data is generated by an encoder for encoding input video data as minimum bitrate macroblock data to produce Discrete Cosine Transform ("DCT") data having DCT coefficients representing a minimum bitrate version of the macroblock data, and for encoding the input video data as intermediate bitrate macroblock data to produce DCT data having DCT coefficients representing an intermediate bitrate version of the macroblock data, and an adaptive motion compensator in signal communication with the encoder for predicting whether a decoded version of the intermediate bitrate macroblock data will have an accumulated predicted error frame energy exceeding a maximum threshold.

BRIEF DESCRIPTION OF THE DRAWINGS

The present disclosure teaches an efficient approach to motion compensation for fine-grain scalable video in accordance with the following exemplary figures, in which.

DETAILED DESCRIPTION

A video data coder-decoder ("CODEC"), in accordance with the embodiments of the present invention described herein, employs discrete cosine transform ("DCT") based manipulation of video data. The video data is preferably organized as macroblocks.

MPEG-4 fine-grain scalability ("FGS") uses a minimum-bitrate previous frame for motion compensation. In accordance with the principles of the invention, the encoder chooses between the minimum-bitrate previous frame and a higher-bitrate previous frame, on a macroblock basis. The encoder tracks the accumulated prediction drift at each frame.

For a given macroblock, if using the higher-bitrate previous frame for motion compensation would result in a prediction drift energy above a maximum limit, the encoder chooses the minimum-bitrate previous frame to predict that macroblock. Otherwise, the encoder chooses the higher-bitrate previous frame to predict the macroblock. The encoder sets a bit (flag) in the coded macroblock to convey to the decoder which version of the previous frame was used for the prediction.

Figure 1:
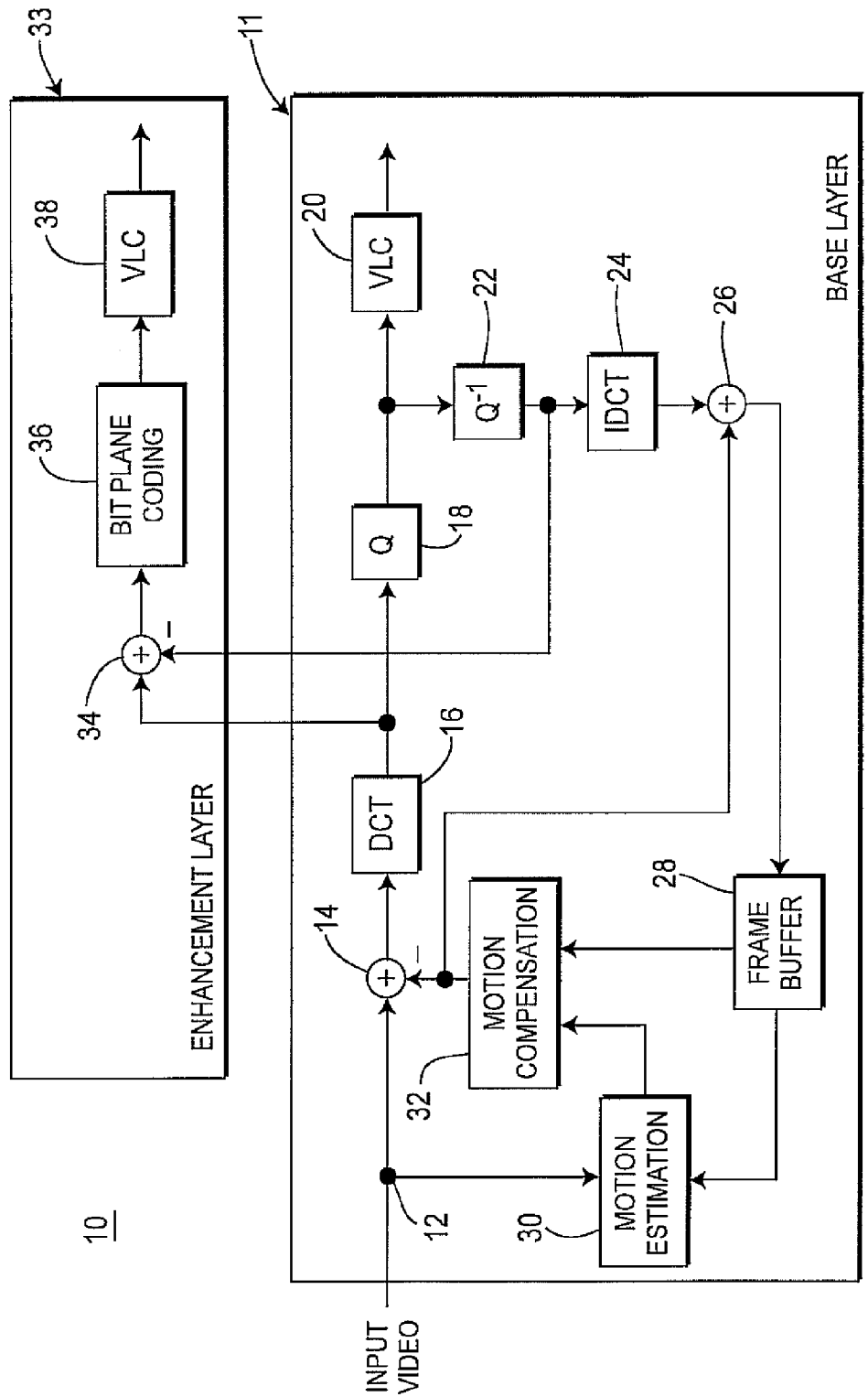
FIG. 1 is a block diagram of a fine-grain scalable ("FGS") encoder with only base layer motion compensation.

As shown in FIG. 1, an FGS encoder 10 can be functionally broken up into a Base Layer portion 11 and an Enhancement Layer portion 33. The Base Layer portion 11 includes an input terminal 12 that is coupled in signal communication to a positive input of a summing block 14. The summing block 14 is coupled, in turn, to a function block 16 for implementing a discrete cosine transform ("DCT"). The block 16 is coupled to a function block 18 for implementing the quantization transform Q. The function block 18 is coupled to a function block 20 for implementing variable length coding ("VLC"). The block 18 is further coupled to a function block 22 for implementing the inverse quantization transform $Q^{-1}$.

The block 22, in turn, is coupled to a function block 24 for implementing an inverse discrete cosine transform ("IDCT"). The block 24 is coupled to a positive input of a summing block 26, which is coupled to a block 28 for implementing a frame buffer. The block 28 is coupled to a function block 30 for performing motion estimation. The input terminal 12 is also coupled to the block 30 for providing an input video signal. The frame buffer 28 and the motion estimation block 30 are each coupled to a block 32 for performing motion compensation. The function block 32 is coupled to a negative input of the summing block 14 and also passed to a positive input of the summing block 26.

The enhancement layer portion 33 includes a summing block 34 having its positive input coupled to the output of the DCT 16, and its negative input coupled to the output of the inverse quantization block 22. The output of the block 34 is coupled to a function block 36 for implementing bit-plane coding. The output of the bit-plane coder 36 is coupled, in turn, to a function block 38 for implementing variable length coding ("VLC").

In operation, the FGS encoder of FIG. 1 uses only the base layer for prediction, as is done in MPEG-4 FGS. The base layer encoder 11 is simply a single layer DCT-based motion-compensated encoder. Initially, input video is motion-compensated, using motion vectors obtained from the motion estimation process. Then the prediction error is transformed using the DCT, and the resulting DCT coefficients are quantized and entropy coded using a variable-length code. To reconstruct the base layer frame, initially, inverse quantization is performed, then an IDCT is performed. The prediction that was subtracted in the motion compensation process is then added back in, and the reconstructed frame is stored in the frame buffer in order to be used as a reference for future pictures.

An initial step in encoding the enhancement layer is to subtract the inverse quantized DCT coefficients in the base layer from the unquantized coefficients. The bit planes are then scanned one at a time and variable-length coded. The decoder will decode some subset of these bitplanes according to the bitrate available at the time of decoding.

Figure 2:
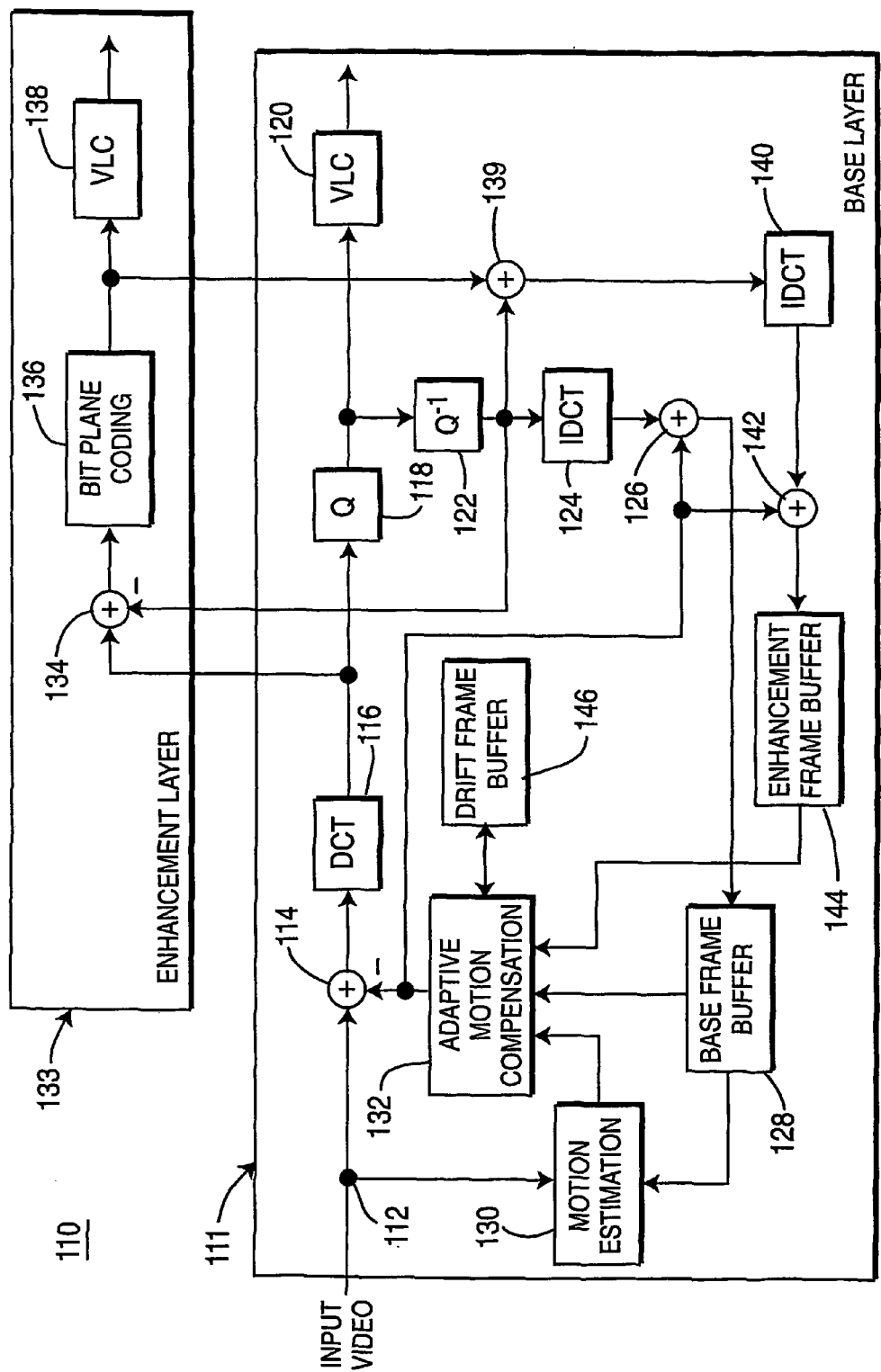
FIG. 2 is a block diagram of a fine-grain scalable ("FGS") encoder with adaptive motion compensation according to a preferred embodiment of the present invention.

Turning to FIG. 2, an exemplary FGS encoder 110, in accordance with the principles of the present invention, can be conceptually broken up into a Base Layer portion 111 and an Enhancement Layer portion 133. The Base Layer portion 111 includes an input terminal 112 that is coupled in signal communication to a positive input of a summing block 114. The summing block 114 is coupled, in turn, to a function block 116 for implementing a discrete cosine transform ("DCT"). The block 116 is coupled to a function block 118 for implementing the quantization transform Q. The function block 118 is coupled to a function block 120 for implementing variable length coding ("VLC"). The block 118 is further coupled to a function block 122 for implementing the inverse quantization transform $Q^{-1}$.

The block 122, in turn, is coupled to a function block 124 for implementing an inverse discrete cosine transform ("IDCT"). The block 124 is coupled to a positive input of a summing block 126, which is coupled to a block 128 for implementing a frame buffer. The block 128 is coupled to a function block 130 for performing motion estimation. The input terminal 112 is also coupled to the block 130 for providing an input video signal. The frame buffer 128 and the motion estimator 130 are each coupled to a function block 132 for performing adaptive motion compensation. The function block 132 is coupled to a negative input of the summing block 114 and also passed to a positive input of the summing block 126.

The enhancement layer portion 133 includes a summing block 134 having its positive input coupled to the output of the DCT 116, and its negative input coupled to the output of the inverse quantization block 122. The output of the block 134 is coupled to a function block 136 for implementing bit-plane coding. The output of the bit-plane coder 136 is coupled, in turn, to a function block 138 for implementing variable length coding ("VLC"). The output of the bit-plane coder 136 is also coupled to a positive input of a summing block 139 comprised by the base layer portion 111.

Returning to the base layer portion 111, the summing block 139 has another positive input coupled from the output of the inverse quantization block 122. The output of the summing block 139 is coupled to a function block 140 for implementing another IDCT. The IDCT 140 is coupled to a positive input of a summing block 142, which has another positive input coupled from the output of the adaptive motion compensator 132. The output of the summing block 142 is coupled to an enhancement layer frame buffer 144. The enhancement layer frame buffer 144 is coupled, in turn, to the adaptive motion compensator 132. A drift frame buffer 146 is coupled in bi-directional signal communication with the adaptive motion compensator 132.

In operation, the FGS encoder of FIG. 2 implements a preferred FGS method, in accordance with the principles of the present invention. A significant difference between the FGS encoder of FIG. 2 and that of FIG. 1 is that in the encoder of FIG. 2, the output of the bit plane coding for a subset of the bit planes in the enhancement layer is added to the inverse-quantized DCT coefficients in the base layer, as an initial step in obtaining the reconstructed enhancement layer frame $f_{mid}$. An IDCT is then performed and the prediction from the motion compensation step is added back in. The result, $f_{mid}$, is stored in the enhancement layer frame buffer. The reconstructed base layer frame, $f_{min}$, is stored in the base layer frame buffer. In the adaptive motion compensation method, apparatus, and system which incorporates the principles of the present invention, the base layer and enhancement layer predictions are read, the accumulated prediction drift is computed assuming the enhancement layer prediction is used, and the appropriate prediction is selected. If the enhancement layer prediction is selected, the accumulated prediction drift is updated and written to the drift frame buffer.

Figure 3:
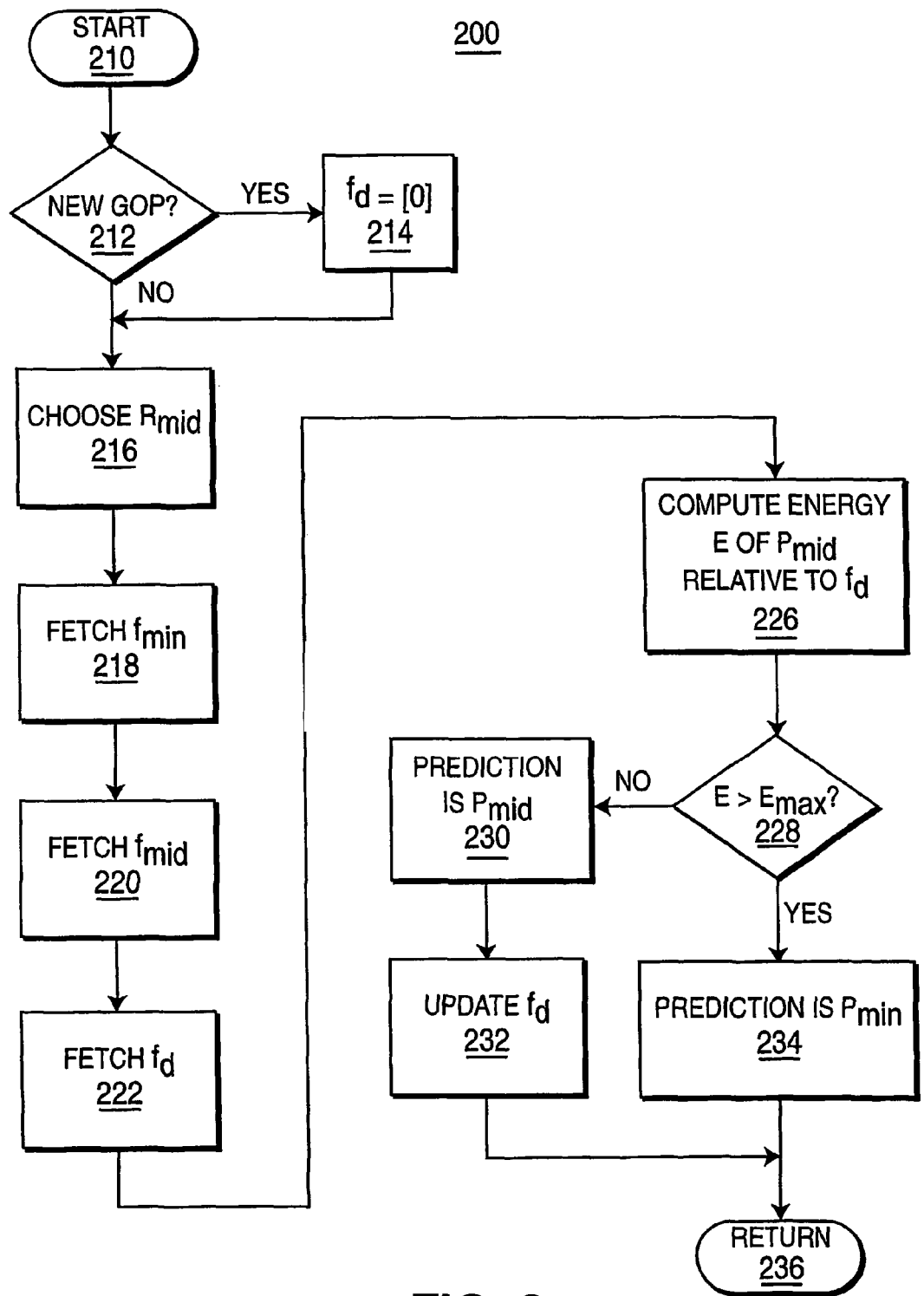
FIG. 3 is a flow diagram for the adaptive motion compensation of FIG. 2, in accordance with the principles of the present invention.

Referring to FIG. 3, the process of adaptive motion compensation referred to in FIG. 2 and accompanying description, and in accordance with the principles of the present invention, is illustrated as method 200. Method 200 begins at start block 210, and proceeds to decision block 212. At decision block 212, it is determined whether the current image begins a new group of pictures ("GOP"). If the current image does begin a new GOP, control passes to function block 214 to reset the accumulated predicted error frame, $F_d$, to zero. After block 214, or if a new GOP was not detected at block 212, control passes to function block 216, which chooses an intermediate bitrate $R_{mid}$, where $R_{mid}$ is any value between a minimum bitrate $R_{min}$ and a maximum bitrate $R_{max}$. For exemplary purposes, $R_{mid}$ may be considered to be halfway between $R_{min}$ and $R_{max}$. Block 216 then passes to function block 218, which fetches a macroblock from the frame, $F_{min}$, corresponding to the previous frame coded at the minimum bitrate $R_{min}$. Block 218 then passes to function block 220, which fetches a macroblock from the frame, $F_{mid}$, corresponding to the previous frame coded at the intermediate bitrate $R_{mid}$. Block 220 then passes to function block 222, which fetches a macroblock from the frame, $F_d$, corresponding to the previous frame accumulated prediction error.

Function block 222 passes control to function block 226. Block 226 computes the energy E of the intermediate bitrate prediction $P_{mid}$ relative to the accumulated prediction error $F_d$, and passes to decision block 228. Decision block 228 determines whether the computed energy E is greater than a threshold $E_{max}$, and if it is not greater, passes control to function block 230. Function block 230 chooses the intermediate bitrate prediction $P_{mid}$, and passes to function block 232. Function block 232 updates the accumulated prediction error frame $F_d$, and passes to a return block 236. At decision block 228, if the energy E is greater than the threshold $E_{max}$, then control is passed to function block 234. Block 234 chooses the minimum bitrate prediction $P_{min}$, and passes to return block 236.

In operation of the present motion compensation method, the minimum and maximum bitrates for the encoded data stream are $R_{min}$ and $R_{max}$ respectively. $R_{mid}$ is any intermediate bitrate between $R_{min}$ and $R_{max}$. Thus, to encode a macroblock, the encoder fetches a motion-compensated block from the previous frame at $R_{min}$ and a motion-compensated block from the previous frame at $R_{mid}$.

The encoder also fetches another block from a frame representing the accumulated prediction drift error. The accumulated prediction drift error frame is reset to zero at the beginning of every group of pictures ("GOP"). The blocks representing the minimum-rate prediction, intermediate rate prediction, and accumulated prediction drift error are referred to as $P_{min}$, $P_{mid}$, and $P_d$, respectively. In order to determine which prediction to use, the encoder computes the energy of the prediction drift error for the $P_{mid}$ prediction. If the energy "E" is defined as a function measuring the energy of a block and if $E_{max}$ is the maximum permitted drift energy threshold, then the appropriate prediction is selected as follows:

If $E(P_d+P_{min}-P_{mid})>E_{max}$ (1)

Prediction=$P_{min}$

Else

Prediction=$P_{mid}$ $P_d=P_d+P_{min}-P_{mid}$

End If

In this exemplary embodiment, a bit is included in the macroblock header to convey to the receiving decoder which prediction block was selected. In the decoder, two decoded versions of each frame, $F_{min}$ and $F_{mid}$, respectively, are written into memory to be used as reference frames. The frame $F_{min}$ represents the frame at the minimum bitrate, while the frame $F_{mid}$ represents the frame at the intermediate bitrate. If the frame is decoded at a bitrate lower than $R_{mid}$, then $F_{mid}$ is approximated using the decoded frame at that lower bitrate.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein With reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A fine-grain scalable video data apparatus comprising:
an encoder for encoding input video data as minimum bitrate macroblock data to produce DCT data having DCT coefficients representing a minimum bitrate version of the macroblock data, and for encoding the input video data as intermediate bitrate macroblock data to produce DCT data having DCT coefficients representing an intermediate bitrate version of the macroblock data; and
an adaptive motion compensator in signal communication with the encoder for predicting whether a decoded version of the intermediate bitrate macroblock data has an accumulated predicted drift error frame energy exceeding a maximum threshold.

2. The apparatus as defined in claim 1 wherein the input video data is fine-grain scalable between the minimum bitrate and a maximum bitrate, the intermediate bitrate falling anywhere therebetween.

3. The apparatus as defined in claim 1 wherein the encoder comprises the adaptive motion compensator.

4. The apparatus as defined in claim 1, the encoder comprising:
an enhancement layer frame buffer;
the adaptive motion compensator in signal communication with the enhancement layer frame buffer; and
a drift frame buffer in signal communication with the adaptive motion compensator.

5. The apparatus as defined in claim 1, the adaptive motion compensator comprising:
a group-of-pictures detector for resetting a drift frame buffer for each new group-of-pictures;
an energy unit for computing the energy of an intermediate-rate prediction relative to the drift frame buffer; and
a prediction unit for selecting one of the intermediate-rate prediction and a minimum-rate prediction for each block of pixels to be predicted from the data of the previous picture using motion vectors for the macroblock data.

6. A fine-grain scalable video data apparatus for receiving encoded video macroblock data wherein each macroblock is capable of being represented by DCT coefficients representing a minimum bitrate version of the macroblock data and DCT coefficients representing an intermediate bitrate version of the macroblock data, the apparatus comprising a decoder for decoding one of the intermediate and minimum bitrate encoded DCT data for each macroblock received from an encoder to produce reconstructed macroblock data responsive to a predicted energy of an accumulated predicted drift error frame.

7. A method for performing fine-grain scalable video data operations, the method comprising:
encoding input video data as minimum bitrate macroblock data to produce DCT data having DCT coefficients representing a minimum bitrate version of the macroblock data;
encoding the input video data as intermediate bitrate macroblock data to produce DCT data having DCT coefficients representing an intermediate bitrate version of the macroblock data; and
compensating the encoded data to predict whether a decoded version of the intermediate bitrate macroblock data has an accumulated predicted drift error frame energy exceeding a maximum threshold.

8. A method as defined in claim 7, further comprising decoding one of the intermediate and minimum bitrate encoded DCT data from the encoded input video data to produce reconstructed macroblock data responsive to the predicted energy of the accumulated predicted drift error frame.

9. A method as defined in claim 7 wherein the input video data is fine-grain scalable between the minimum bitrate and a maximum bitrate, the intermediate bitrate falling anywhere therebetween.

10. A method as defined in claim 7, further comprising compensating enhancement layer block data with enhancement layer data of a previous picture and motion vectors to produce compensated enhancement layer block data such that DCT is performed with respect to the compensated enhancement layer block data to produce the enhancement layer DCT data.

11. A method for receiving encoded video macroblock data wherein each macroblock is capable of being represented by DCT coefficients representing a minimum bitrate version of the macroblock data and DCT coefficients representing an intermediate bitrate version of the macroblock data, the method comprising decoding one of the intermediate and minimum bitrate encoded DCT data for each macroblock received from the encoder to produce reconstructed macroblock data responsive to a predicted energy of an accumulated predicted drift error frame.

12. A program storage device readable by machine, tangibly embodying a program of instructions executable by the machine to perform steps for performing fine-grain scalable video data operations, the steps comprising:
   encoding input video data as minimum bitrate macroblock data to produce DCT data having DCT coefficients representing a minimum bitrate version of the macroblock data;
   encoding the input video data as intermediate bitrate macroblock data to produce DCT data having DCT coefficients representing an intermediate bitrate version of the macroblock data; and
   compensating the encoded data to predict whether a decoded version of the intermediate bitrate macroblock data will have an accumulated predicted drift error frame energy exceeding a maximum threshold.

13. A program storage device as defined in claim 12, the steps further comprising decoding one of the intermediate and minimum bitrate encoded DCT data from the encoded input video data to produce reconstructed macroblock data responsive to the predicted energy of the accumulated predicted drift error frame.

14. A program storage device as defined in claim 12 wherein the input video data is fine-grain scalable between the minimum bitrate and a maximum bitrate, the intermediate bitrate falling anywhere therebetween.

15. A program storage device as defined in claim 12, the steps further comprising compensating enhancement layer block data with enhancement layer data of a previous picture and motion vectors to produce compensated enhancement layer block data such that DCT is performed with respect to the compensated enhancement layer block data to produce the enhancement layer DCT data.

16. A program storage device readable by machine, tangibly embodying a program of instructions executable by the machine to perform steps for receiving encoded video macroblock data wherein each macroblock is capable of being represented by DCT coefficients representing a minimum bitrate version of the macroblock data and DCT coefficients representing an intermediate bitrate version of the macroblock data, the steps comprising decoding one of the intermediate and minimum bitrate encoded DCT data for each macroblock received from the encoder to produce reconstructed macroblock data responsive to a predicted energy of an accumulated predicted drift error frame.

17. A fine-grain scalable video data system for performing fine-grain scalable video data operations, the system comprising:
   minimum encoding means for encoding input video data as minimum bitrate macroblock data to produce DCT data having DCT coefficients representing a minimum bitrate version of the macroblock data;
   intermediate encoding means for encoding the input video data as intermediate bitrate macroblock data to produce DCT data having DCT coefficients representing an intermediate bitrate version of the macroblock data; and
   compensating means for compensating the encoded data to predict whether a decoded version of the intermediate bitrate macroblock data will have an accumulated predicted drift error frame energy exceeding a maximum threshold.

18. A system as defined in claim 17, further comprising decoding means for decoding one of the intermediate and minimum bitrate encoded DCT data from the encoded input video data to produce reconstructed macroblock data responsive to the predicted energy of the accumulated predicted drift error frame.

19. A system as defined in claim 17 wherein the input video data is fine-grain scalable between the minimum bitrate and a maximum bitrate, the intermediate bitrate falling anywhere therebetween.

20. A system as defined in claim 17, further comprising compensating means for compensating enhancement layer block data with enhancement layer data of a previous picture and motion vectors to produce compensated enhancement layer block data such that DCT is performed with respect to the compensated enhancement layer block data to produce the enhancement layer DCT data.

21. The apparatus as defined in claim 1 wherein the encoder comprises:
   a bit plane coder for bit plane coding a subset of bit planes for an enhancement layer bitstream corresponding to the intermediate bitrate version of the macroblock data;
   a variable length coder having an input in signal communication with an output of said bit plane coder for outputting the enhancement layer bitstream; and
   a combiner having a first input for receiving inverse quantized DCT coefficients of a base layer corresponding to minimum bitrate version of the macroblock data and a second input in signal communication with an output of said bit plane coder, wherein said combiner combines the inverse quantized DCT coefficients of the base layer and the output of the bit plane coder for the subset of the bit planes in the enhancement layer to obtain a reconstructed enhancement layer frame corresponding to the intermediate bitrate version of the macroblock data.

* * * * *